April 27, 1965  J. C. SHEAR ETAL  3,179,962
FLOTATION APPARATUS AND MECHANICAL CONTROL THEREFOR
Filed Dec. 24, 1963
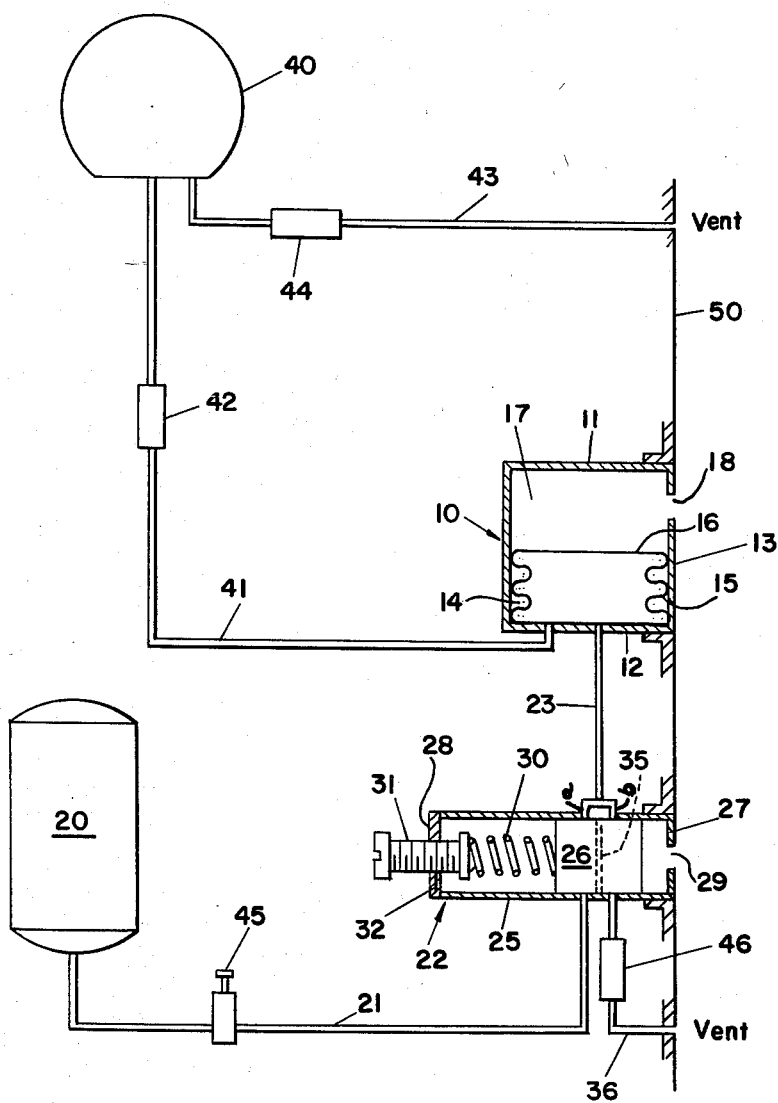
INVENTORS.
JOHN C. SHEAR
LESTER N. POUST
BY
ATTORNEY

3,179,962
FLOTATION APPARATUS AND MECHANICAL CONTROL THEREFOR

John C. Shear, Grand Island, and Lester N. Poust, Tonawanda, N.Y., assignors, by mesne assignments, to the United States of America as represented by the Secretary of the Navy Filed Dec. 24, 1963, Ser. No. 333,244
2 Claims. (Cl. 9—8)

This invention involves flotation and is concerned particularly with apparatus for locating or positioning a device in a body of water and for controlling the movement of the device.

The apparatus or system of the invention is an improvement over the copending application Serial No. 333,233 filed December 24, 1963 of John A. Meyer and Chester S. Ingraham for Flotation Apparatus and Electrical Control Therefor and consists of an assembly of mechanical elements which are arranged to coact automatically. The assembly is formed of housing structure providing a control chamber which has a pneumatic zone in communication with a gas pressure source and a liquid zone in communication with the body of water. Pressure gas is supplied to the pneumatic zone and removed from the pneumatic zone in a manner to regulate the water volume in the liquid zone for the purpose of varying the buoyance of the housing structure and the apparatus associated therewith. The mechanical control for varying the buoyancy of the apparatus is in the provision of valve means which is constructed to be operable by the pressure of the body of water to regulate the gas volume in the pneumatic zone for suspending the apparatus within a selected depth range.

The principal object of the invention is to provide flotation apparatus for suspending a device in a body of water at a preset or controlled depth range.

Another object is to provide flotation apparatus which is constructed of a multiplicity of operating parts which are so coordinated as to provide an efficient and inexpensive operative structure.

Another object is to provide a flotation apparatus of a multiplicity of inexpensive components which are arranged to coact automatically to attain a preset or controlled range of depth.

Other objects and advantages will be apparent from the following detailed description of the invention taken in conjunction with the accompanying drawings in which the single figure is generally a schematic diagram of the apparatus or system with certain elements sectioned to show essential details.

Referring to the figure, a housing is indicated at 10 and may conveniently, for example, be cylindrical and formed as shown by end walls 11 and 12 and a side wall 13 to provide a control chamber indicated at 14. The control chamber 14 is provided with an expansible cylindrical control container in the form of a bellows 15 which may be supported, as shown, with its open end secured to the end wall 12 and a closed end 16 providing a space 17 with the other end wall 11 of the cylinder. The housing is apertured at 18 to be in direct communication with the body of water and to form the space 17 into a water ballast zone which will vary in volume depending on the distance of the closed end 16 of the bellows 15 from the end 11 of the control chamber 14. Expansion of the bellows 15 will decrease the volume of water in space 17 and increase the buoyancy while contraction of the bellows will increase the water volume and decrease the buoyancy. At 20 is indicated a gas source from which gas is transmitted by line 21 to a flow control means 22 for passage therefrom by conduit 23 into the expansible diaphragm 15. The gas source 20 is a closed chamber containing liquid carbon dioxide maintained at an absolute pressure which is higher than the maximum pressure at which the apparatus of the invention is to operate. Liquid carbon dioxide has been found satisfactory for pressure depths in sea water of around 500 feet.

The flow control means 22 will be operative to supply gas to the expansible container 15 from the source 20 and to remove gas from the expansible container and may take the form of a shuttle, spool, poppet, needle, rotary or other type valve having a movable valve element which is operative when the water pressure overcomes a reference pressure applied thereto for supplying gas to the expansible container. One type valve embodiment which may be used in shown and is formed of a cylinder 25 having a valve plug or piston 26 disposed therein and arranged for movement axially of the cylinder between the cylinder ends 27 and 28. The valve plug 26 may have a diameter substantially equal to that of the cylinder 25 to provided a frictional or sealed fit therewith to require some force to move it from one position to another position and the end 27 is apertured at 29 so that pressure of the body of water will be applied directly and constantly to one end of the plug. Pressure is applied to the other end of plug 26 by means of a spring 30 disposed as shown between the plug 26 and an adjusting follower screw 31 which is movable in a threaded aperture 32 in the end 28 of the cylinder 25. The spring 30 provides a reference force which is adjustable by means of the screw 31 to set the plug in a position for movement by water pressure against the spring pressure at some preselected depth.

The valve plug 26 is provided with a diametrical passageway 35 as shown or the passageway may be an annular groove for the purpose of supplying gas from the source 20 to the expansible diaphragm 15 when the passageway is coincident with the conduits 21 and 23. In the figure, the passageway 35 is shown in an inoperative position. In order to supply gas to and remove gas from the bellows 15, the conduit 23 is forked to provide branches $a$ and $b$ as shown; the branch $a$ functioning to supply gas to the bellows 15 and the branch $b$ functioning to vent gas from bellows 15, when the passageway 35 coincides with branch $b$, through vent conduit 36 which communicates between the cylinder 25 and the body of water.

In order to provide additional buoyancy for the apparatus an inflatable container 40 is arranged in communication with the bellows 15 by conduit 41 which has a check valve 42 therein to permit passage of gas to container 40 but prevents its return to be the bellows 15. A vent conduit 43 is also provided for container 40 and has a pressure relief valve 44 therein to prevent over pressurization of container 40. A flow control valve 45 is provided in conduit 21 for regulating flow of $CO_2$ from source 20 as desired and a check valve 46 is provided in vent conduit 36 to permit passage of gas from bellows 15 and also for preventing entry of water into the bellows. At 50 is indicated the wall of an enclosure which may be required for certain elements of the apparatus which should not be subjected to the water pressure.

In operation of the above described apparatus, it will be understood that the force exerted by the spring 30 against the plug 26 will determine the depth at which gas will be supplied to the control bellows 15. This force may be controlled by other mechanisms than the screw, such as a cam, an eccentric, a micrometer type screw, etc. Supply gas from 20 will be admitted to the bellows 15 when the water pressure exerted through the opening 29 overcomes the compression of spring 30 and aligns the passageway 35 with conduit 21 and branch $a$ of conduit 23. This will occur at some pressure depth for which the spring 30 has been set. If the preset depth, for example, is 100 feet and the passageway 35 is in the inoperative position shown in the figure, the housing 10 will have negative buoyancy and will sink, when placed in a body of water, until it reaches the 100 foot depth. At this depth, the force of the water pressure on the valve plug 26 equals the force exerted by the spring but as the housing 10 and associated equipment continues to sink, the water pressure exceeds the preset spring force and moves the valve plug against the pressure of spring 30. Movement of the valve plug continues until $CO_2$ from source 20 is directed into the control bellows 15 by passageway 35 and into the inflatable container 40 when the container 40 is part of the apparatus. The $CO_2$ will continue to flow into the control bellows 15 until the bellows is inflated to reduce the water volume in space 17 sufficiently to permit the housing to rise along with the attached equipment. As the assembly rises the water pressure will decrease and the plug 26 will move toward its inoperative position and the assembly will eventually reach a depth at which the passageway 35 will be aligned with branch b and gas will be exhausted through conduit 36 from the control bellows 15.

The flotation device or apparatus will continue to rise and the shuttle valve 26 will reciprocate to alternately supply gas to control bellows 15 and remove gas therefrom permitting the apparatus to hover or be suspended between lower and upper depth limits. This cycle of operation will continue until the gas from source 20 becomes ineffective to operate the apparatus, and in this connection it should be noted that gas is vented only from the control bellows 15 and not from the auxiliary inflatable container 40 during each cycle. Consequently, only minor amounts of gas that pass from the control bellows 15 are vented during a cycle.

Obviously many modifications and variations of the present invention are possible in the light of the above teachings. It is therefore to be understood that, within the scope of the appended claims, the invention may be practiced otherwise than as specifically described.

We claim:
1. Flotation apparatus which comprises,
    (a) a housing having an opening therein permitting the entry of water,
    (b) an expansible container mounted within the housing,
    (c) a gas source and a flow control valve including a cylinder having an axially movable piston therein,
    (d) a first gas supply conduit between the gas source and the cylinder and a second gas supply conduit between the cylinder and the expansible container,
    (e) a first gas removal conduit between the expansible container and the cylinder and a second gas removal conduit communicating with the cylinder,
    (f) said piston being frictionally positioned in the cylinder,
    (g) said cylinder having spring biasing means at one end abutting the piston and an aperture at its other end and
    (h) a passageway in the piston which is operative when the piston is moved toward said one end of the cylinder to place the supply conduits in communication and admit gas to the expansible container and operative when the piston is moved toward said other end of the cylinder to place the removal conduits in communication and exit gas from the expansible container.

2. Flotation system for suspending an object in a body of water which comprises,
    (a) a housing having an opening therein communicating with the body of water,
    (b) an expansible container mounted within the housing for controlling the volume of water in the housing,
    (c) a gas source and a flow control valve including a cylinder having a frictionally held axially movable piston therein,
    (d) a first gas supply conduit between the gas source and the cylinder and a second gas supply conduit between the cylinder and the expansible container,
    (e) a first gas removal conduit between the expansible chamber and the cylinder and a second gas removal conduit communicating between the cylinder and the body of water,
    (f) said cylinder being apertured at one end to apply water pressure to one end of the piston and said cylinder having force applying means at its other end to apply a predetermined pressure to the other end of the piston,
    (g) a passageway in the piston which is operative to place the supply conduits in communication and inflate the expansible container when the piston is moved by the water pressure and operative to place the gas removal conduits in communication for deflating the expansible container when the piston is moved by the pressure of the force applying means whereby an object may be suspended within a predetermined depth range.

References Cited by the Examiner
UNITED STATES PATENTS

| | | | |
|---|---|---|---|
| 952,450 | 3/10 | Leon | 104—14 |
| 1,363,958 | 12/20 | Dalen | 102—14 |
| 1,443,431 | 1/23 | Palmer | 102—14 |
| 3,123,842 | 3/64 | Oeland et al. | 9—9 |

FERGUS S. MIDDLETON, *Primary Examiner.*